A. McMURTRIE.
ELECTRICAL WIRING APPARATUS.
APPLICATION FILED JULY 18, 1912.
1,049,752. Patented Jan. 7, 1913.
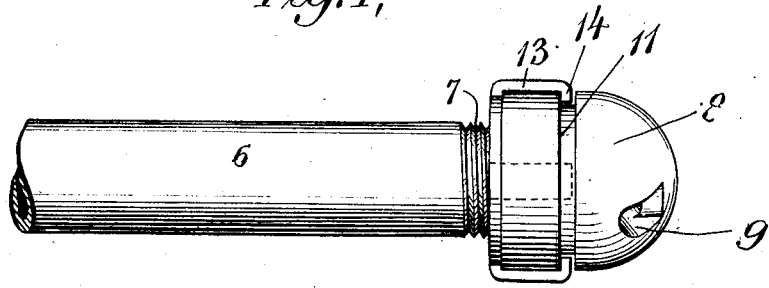
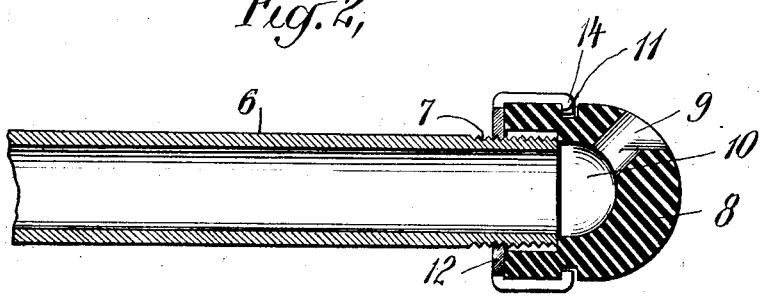
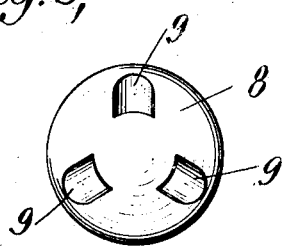
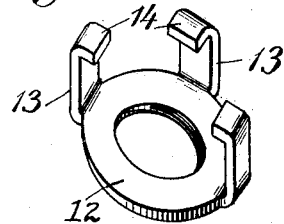
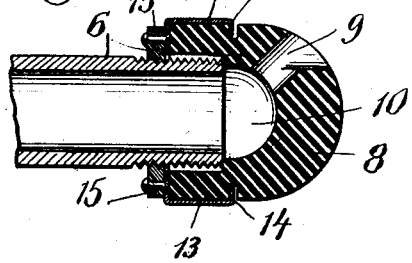
WITNESSES
INVENTOR
Adnah McMurtrie
BY
Edmonds & Edmonds
ATTORNEY

UNITED STATES PATENT OFFICE.

ADNAH McMURTRIE, OF NEW YORK, N. Y., ASSIGNOR TO THOMAS & BETTS COMPANY, OF NEW YORK, N. Y., A CORPORATION OF NEW YORK.

ELECTRICAL-WIRING APPARATUS.

1,049,752.     Specification of Letters Patent.     Patented Jan. 7, 1913.

Application filed July 18, 1912. Serial No. 710,121.

*To all whom it may concern:*

Be it known that I, ADNAH McMURTRIE, a citizen of the United States, residing in the borough of Manhattan, city, county, and State of New York, have invented certain new and useful Improvements in Electrical-Wiring Apparatus, of which the following is a specification.

This invention relates to electrical wiring apparatus and particularly to apparatus adapted to be employed at the end of a conduit for electric conductors where the conductors are led out from the conduit to a suitable lighting or other translating device. The invention is directed to the provision of improved apparatus for use in this way so constructed that it may be readily manipulated in securing it to the conduit and detaching it therefrom, that it will be firmly held in position upon the end of the conduit and that it will hold the conductors properly separated and insulated one from another.

When installing electric lighting apparatus in a building, conduits are employed for the conductors and where the conductors emerge from the conduits it is necessary to so support them as to prevent abrasion of their insulation and consequent short-circuiting. Outlet boxes are commonly employed into which the conduits run and to which the ends of the conduits are secured. In some cases, however, the use of such an outlet box is undesirable or impossible and for such cases it has been proposed to apply a head formed of insulating material, to the end of the conduit, this head being provided with separated openings through which the conductors are led.

The present invention relates to apparatus of this character and involves the provision of an improved form of insulating head for application to the end of a conduit and improved means for securing the head to the end of the conduit.

The preferred embodiment of the invention is illustrated in the accompanying drawings in which—

Figure 1 is an elevation of apparatus embodying the invention, Fig. 2 is a central section of the parts shown in Fig. 1, Fig. 3 is a plan view of the insulating head, Fig. 4 is a perspective view of the member for securing the head to the conduit and Fig. 5 is a view similar to Fig. 2 illustrating a modification.

Referring to these drawings, a conduit of the usual or any suitable construction is shown at 6, this being provided with a threaded end 7. Electrical conductors are run through the conduit 6 and emerge from the end 7 thereof, from which end they lead to an electric light or other translating device. If no means were provided for supporting and separating the conductors, the insulation thereof might become abraded by rubbing against the end of the conduit and short-circuiting might result. To avoid this, a head 8, formed of insulating material, is applied to the end of the conduit 6, this head being provided with separated openings 9 therethrough, through each of which one of the electrical conductors is led.

The construction of the head 8 is clearly shown in Fig. 2. It is of larger diameter than the conduit 6 and of cylindrical form but one end is curved hemispherically. Through this curved end are one or more passageways 9 which lead to a depression 10 opening at the end of the head. A shoulder is formed in the wall of this depression as shown in the drawings, so that when the end of the conduit is inserted in the depression, said end will abut against the shoulder and the portion of the conduit adjacent to the end will be inclosed by the portion of the head about said depression. On the exterior of the head is a circumferential shoulder 11, preferably provided by forming a circumferential groove in the exterior of the head.

The head must be so arranged that it can be readily mounted upon the end of the conduit 6 but in so mounting it the head cannot be rotated because the conductors are inserted through the openings 9 in the head before the latter is secured upon the conduit. I therefore employ, as a means for securing the head upon the conduit, a member adapted to be mounted upon the conduit and secured to the head but rotatable relatively to the head, so that, though the head is not turned, the member may be rotated so as to cause it to engage the threads on the end of the conduit. This member is shown at 12. It consists of a piece of metal in the form of a washer having a plurality of integral projections 13 which are bent at a right angle to the body of the member 12 and have their ends 14 turned inwardly at a right angle so as to coact with the shoulder 11 on the head 8. The construction of this member is shown in Fig. 4. Preferably three of the projections 13 are provided on the member 12, these three being arranged with two of them diametrically opposite each other and the third preferably midway between the other two.

In assembling the parts, the member 12 is mounted upon the member 8 with the ends 14 of the fingers 13 engaging the shoulder 11. The conductors are then passed through the opening in member 12 and the separated openings 9 in the head 8. The member 12 is then threaded upon the end 7 of the conduit 6 by being turned relatively to the head and the conduit, and in doing so the end of the conduit enters the depression in the head until the parts are finally in the relative positions in which they are shown in Figs. 1 and 2. While this is being done, the head 8 is not rotated and therefore the conductors passing through the head are not twisted. Also, when the parts have reached their final positions with the end of the conduit projecting within the head, the conduit holds the head against movement transverse to the axis of the conduit.

Fig. 5 shows a slight modification of the construction above described in that the member for securing the head to the conduit is formed in two parts so that the arms 13 and projections 14 may be made of light metal. The part including these arms is secured to a nut 15 so as to rotate with the nut, the nut being provided with threads for engaging the threads of the conduit.

With the construction above described, the head is held securely upon the conduit and may be readily detached therefrom or connected thereto when desired. This construction possesses the further advantage that it may be manufactured at very low cost, this being due largely to the fact that the member 12 can be shaped to its final form before assembling it and the head with which it is employed.

Having now described my invention, what I claim as new therein and desire to secure by Letters Patent of the United States is:—

The combination with a conduit for electrical conductors having a threaded end, of a head of larger diameter than said conduit, formed of insulating material and having an exterior circumferential groove, said head being provided with a circular depression in one end thereof into which the end of the conduit fits, a shoulder in the wall of the depression against which the end of the conduit abuts and openings leading from the bottom of the depression through the head, and a metallic member having a threaded opening to receive the threaded end of the conduit and provided with arms which are bent to extend along the surface of the portion of the head inclosing the end of the conduit, and which have their ends turned inwardly to enter said circumferential groove in the head, said member being rotatable independently of the head while screwing it upon the end of the conduit, substantially as set forth.

This specification signed and witnessed this 16th day of July, 1912.

ADNAH McMURTRIE.

Witnesses:
Wm. H. McCormick,
D. S. Edmonds.

Copies of this patent may be obtained for five cents each, by addressing the "Commissioner of Patents, Washington, D. C."